United States Patent

[11] 3,589,251

| [72] | Inventor | Charles Samuel Webb<br>Rochester, N.Y. |
|---|---|---|
| [21] | Appl. No. | 765,111 |
| [22] | Filed | Oct. 4, 1968 |
| [45] | Patented | June 29, 1971 |
| [73] | Assignee | Eastman Kodak Company<br>Rochester, N.Y. |

[54] SHUTTER SPEED CONTROL
5 Claims, 3 Drawing Figs.

[52] U.S. Cl. .................................................. 95/10,
  95/53
[51] Int. Cl. .................................................. G03b 7/08,
  G03b 9/58
[50] Field of Search ......................................... 95/10 C,
  53, 63; 58/116 M

[56] References Cited
UNITED STATES PATENTS

| 3,400,645 | 9/1968 | Kiper | 95/10 (C) |
| 3,417,683 | 12/1968 | Kiper | 95/10 (C) |
| 3,479,935 | 11/1969 | Harvey | 95/53 X |

FOREIGN PATENTS

| 1,501,407 | 10/1967 | France | 95/53 |

Primary Examiner—Samuel S. Matthews
Assistant Examiner—Joseph F. Peters, Jr.
Attorneys—R. W. Hampton and Daniel E. Sragow ABSTRACT: An electromagnet is employed to control the speed of a camera shutter by controlling the force on a pivotal member which engages a portion of the shutter. The field strength of the electromagnet is determined by the light incident on the photoresistive element included in an electrical circuit which determines the current flow through the electromagnet.

PATENTED JUN29 1971        3,589,251

CHARLES S. WEBB
INVENTOR

BY Daniel E. Snagos
Robert W. Hampton
ATTORNEYS

SHUTTER SPEED CONTROL

BACKGROUND OF THE INVENTION

As is well known in the art, to obtain a proper photograph the amount of light which is allowed to strike the light sensitive film must be closely controlled. While in very simple cameras no provision is made for controlling the amount of light allowed to strike the light sensitive film on exposure, more sophisticated cameras have provided such control either by varying the aperture opening through which the light is allowed to pass from the photometric field to the light sensitive film, and/or by controlling the speed of the shutter mechanism which uncovers the exposure aperture to allow light to pass to the film for exposure.

For some time, even relatively inexpensive cameras have been made in such a manner that the exposure of the light sensitive film is automatically varied in response to the light incident from the photometric field. The end result is often accomplished by varying the speed of the shutter, while employing a constant exposure aperture opening. Since these cameras are relatively inexpensive, sophisticated exposure controls are not economically feasible since it is important that the cost of the exposure control mechanism be kept relatively low.

SUMMARY OF THE INVENTION

In accordance with the present invention, a structure has been developed which can be manufactured at a low cost and yet will reliably control the speed of operation of the shutter of a photographic camera.

In practicing the invention, shutter control means for a photographic camera are provided in which said means comprises a shutter which is movable from a first position to a second position for uncovering a lens aperture for a predetermined period of time and means for variably retarding the movement of the shutter, the degree of retardation being a function of scene illumination intensity.

More particularly, in practicing one embodiment of the invention, a photosensitive element is connected so as to control the magnetomotive force of a magnetically permeable material, such as soft iron, which forms a controllable electromagnet. A pivotal member is pivoted so that an arm is placed in proximity to the electromagnet which thus acts as a variable spring on the pivotal member. The greater the force exerted on the pivotal member, the slower it is able to move.

Those portions of the pivotal member opposite the electromagnet contact a portion of the shutter in such a manner that the shutter tends to move the pivotal member about its pivot alternately in opposite directions. Thus, the stronger the force exerted by the electromagnet, the greater the resistance to the movement of the shutter and, consequently, the greater the time which the shutter will require to traverse the lens aperture and expose the film.

A photosensitive element is connected so that the strength of the force exerted by the electromagnet decreases with increased light intensity. Thus, the resistance offered by the pivotal member also decreases with increasing light intensity, so as to provide for faster shutter speeds and proper exposure.

It is thus an object of this invention to provide a shutter control mechanism including an electromagnetically controlled pivotal member, with the field strength of the electromagnet inversely dependent upon the intensity of the light incident from the photometric field, so as to control the retarding effect of the pivotal member on the shutter.

DESCRIPTION OF THE PREFERRED EMBODIMENTS

Figure 1:
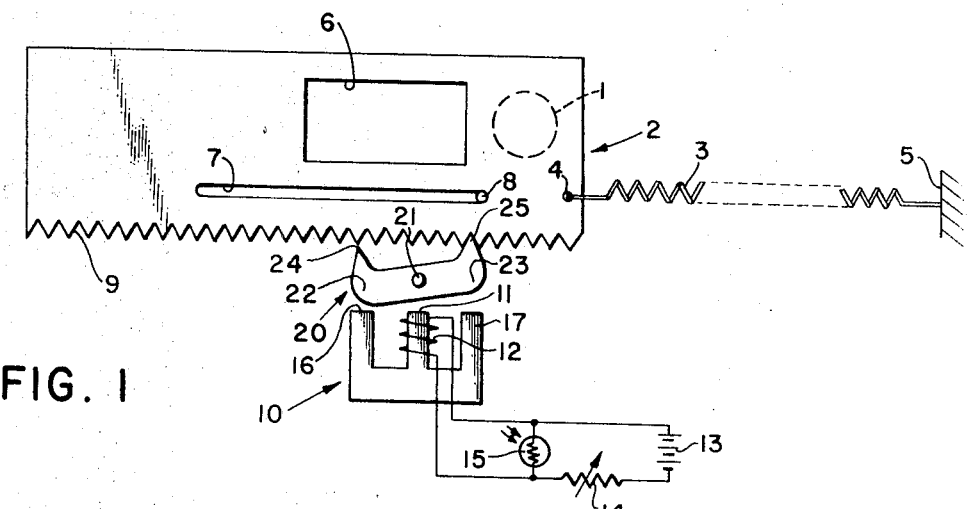
FIG. 1 is a partially diagrammatic, partially schematic view of a lens shutter employing a shutter control of the present invention, prior to release of the shutter.
Figure 2:
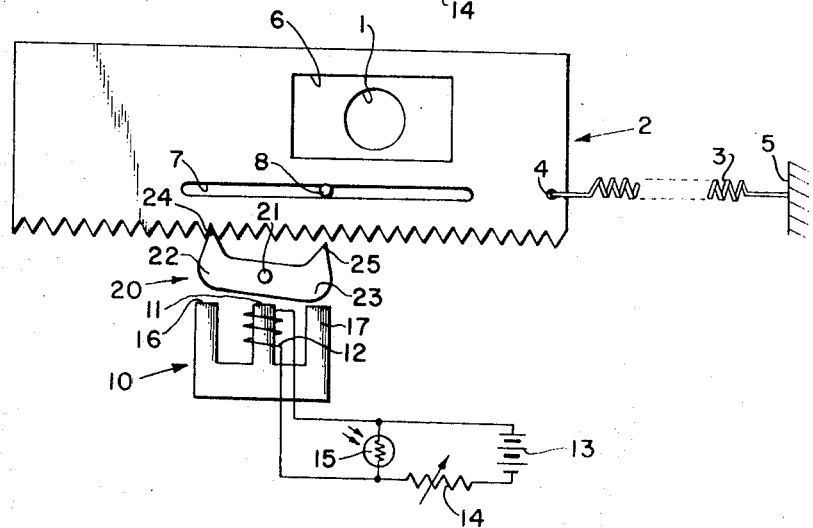
FIG. 2 is a view, similar to FIG. 1, showing the shutter during movement across the lens aperture.

Referring to the accompanying drawing, and particularly to FIG. 1, a portion of a camera is shown, including a lens aperture 1 and a shutter member 2. When the shutter is released (by means not shown) it is caused to move to the right, as viewed in the FIGURE, by means of tension spring 3, mounted to the shutter at point 4 and to the camera body (not shown), at point 5. The shutter is provided with an opening 6 which moves across the lens aperture 1 so as to expose the film (not shown), as the shutter is moved by tension spring 3.

The shutter is also provided with a guide slot 7 which is situated on fixed pin 8 which is mounted to the camera body (not shown). The extremities of the slot 7 limit movement of shutter member 2 with respect to the camera body, due to the abutting of pin 8 at the two extremities. Thus, when the shutter is cocked, by means not shown, the shutter is moved to the left, as seen in the drawing, and the pin 8 abuts against the right extremity of the slot 7. On the other hand, when the shutter is released and the shutter moves to the right, as seen in the drawing, its motion during exposure is limited by abutment of pin 8 against the left extremity of slot 7.

An E-shaped electromagnet 10 is also shown in FIG. 1. About the center leg 11 of E-shaped core is placed a coil of conducting wire 12. Electrical energy is supplied to this coil 12 through a suitable current source 13 which is electrically connected to the coil.

The level of current supplied to the coil 12 is determined by the setting of variable resistor 14 and by the light incident from the photometric field on the photoresistive element 15, the latter being connected in parallel with the coil 12. The variable resistor 14 can be employed to calibrate the shutter speed. As can readily be seen, as the light incident on the photoresistive cell increases, the current supplied to coil 12 decreases. Conversely, at lower photometric field light levels, the current supplied to coil 12 is correspondingly increased. As the field strength of the electromagnet 10 is a function of the current supplied to coil 12, this means that the strength of the electromagnet is highest at the lowest light levels.

In operation, when the shutter is released, teeth 24 and 25 of pivotal member 20 alternately engage the serrations 8 formed in the lower surface of shutter 2. This engagement retards the movement of the shutter in the direction in which it is urged by spring 3. As the field strength of the electromagnet 10 is increased, so that the attraction between, for example, arm 22 and leg 16 is increased, a greater force must be overcome by the moving shutter in forcing teeth 24 or 25 out of serrations 8. Thus, with this greater field strength on the electromagnet, the shutter moves more slowly, in response to the urging of spring 3, and lens aperture 1 is uncovered for a longer period of time by opening 6 in shutter 2. Consequently, the exposure time is longer. As previously mentioned, when the light from the photometric field decreases, the strength of the electromagnet increases, so that a slower shutter speed is produced for a proper exposure.

Figure 3:
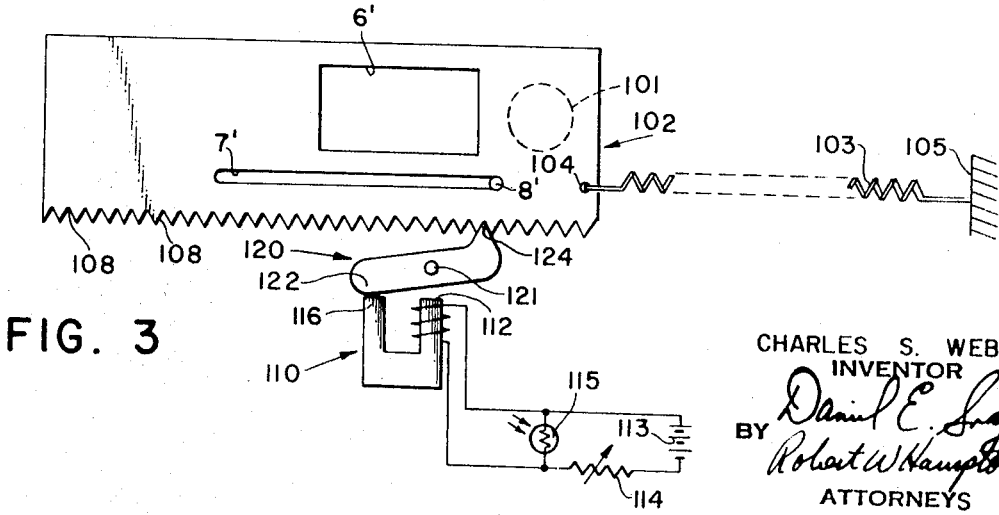
FIG. 3 is a view similar to FIG. 1, of a second embodiment of the present invention.

In FIG. 3 a second embodiment of the invention is shown employing a U-shaped electromagnet 110 with a one-arm pivotal member 120 pivoted at 121 above the coil 112. Arm 122 of this pivotal member is in proximity to leg 116 of the U-shaped magnet and, as before, when the electromagnet is activated, the arm 122 and leg 116 have opposite polarities so as to be attracted.

Tooth 124 of pivotal member 120 engages serrations 108 in shutter 102. As in the first embodiment, shutter 102 is moved to the right, as seen in the FIGURE, through action of tension spring 103, mounted to the shutter at 104 and to the camera body, as at 105.

The operation of the shutter in this embodiment is the same as that described for the first embodiment, except that there is only one tooth of the pivotal member to be disengaged from the serrations. Similarly, the electrical circuit can be the same employing a current source 113 with variable resistor 114, and photoresistive cell 115, the latter in parallel connection with coil 112.

It will be obvious to those skilled in the art that other circuits can be employed in the present invention, so long as the power supplied to the electromagnet is inverse to the light intensity of the photometric field. The circuit can be modified, for example, to provide increased power to the electromagnet by adding a transistor amplifier. Furthermore, a transistorized phase inverter may be used so that the series resistance of the coil is increased, with an increase in illumination intensity, rather than decreasing the coil shunt resistance.

The invention has been described in detail with particular reference made to preferred embodiments thereof, but it will be understood that variations and modifications can be effected within the spirit and scope of the invention as described hereinabove and as defined in the appended claims.

I claim:

1. Shutter control means for a photographic camera including an exposure aperture, said control means comprising:
    a. a shutter blade movable along a path to effect an exposure;
    b. serrations on a portion of said shutter blade;
    c. a pivotal member having at least one arm with a tooth position to intermittently engage said serrations during movement of said shutter;
    d. an electromagnet positioned to attract said pivotal member to vary the rate of intermittent engagement of said pivotal member with said serrations in accordance with the energization of said electromagnet;
    e. a photoresponsive cell;
    f. means, electrically connecting said electromagnet to said cell, to vary the energization of the electromagnet as an inverse function of the amount of light incident on said photoresponsive cell.

2. Shutter control means of claim 1 wherein said electromagnet is an E-shaped core having a coil on the center leg and said pivotal member has two arms.

3. Shutter control means of claim 1 wherein said electromagnet is a U-shaped magnet.

4. In a photographic camera including an exposure aperture, shutter control means comprising:
    a. shutter means including a member normally in a first position in which the exposure aperture is covered and movable along a path to effect an exposure through the aperture for an interval determined by the speed of movement of said shutter member;
    b. means defining serrations associated with said shutter member for movement therewith;
    c. a pivotal member adapted to intermittently engage said serrations to govern the speed of movement of said shutter member along its path;
    d. electromagnetic transducer means associated with said pivotal member for varying the rate of intermittent engagement of said pivotal member with said shutter member in accordance with the energization of said electromagnet;
    e. photoresponsive means for regulating the field strength of the electromagnet as a function of the amount of light incident on said photoresponsive means, so that the shutter speed is governed as a function of the amount of such light.

5. In a photographic camera including an exposure aperture, shutter control means comprising:
    a. shutter means including a member normally in a first position in which the exposure aperture is covered and movable along a path to effect an exposure through the aperture for an interval determined by the speed of said shutter member;
    b. an escapement mechanism including a serrated member associated with said shutter member for movement therewith, and a pivotal member adapted to intermittently engage the serrations to govern the speed of movement of the serrated member;
    c. electromagnetic transducer means associated with said pivotal member to control the rate of intermittent engagement of the escapement members as a function of the energization of said electromagnet; and
    d. photoresponsive means for regulating the field strength of the electromagnet as a function of the amount of light incident on said photoresponsive means, whereby the shutter speed is governed as a function of the amount of such light.